(12) United States Patent
Turner

(10) Patent No.: US 6,296,072 B1
(45) Date of Patent: Oct. 2, 2001

(54) ELECTRIC BICYCLE AND METHODS

(75) Inventor: James R. Turner, Boulder, CO (US)

(73) Assignee: Opti-Bike LLC, Boulder, CO (US)

( * ) Notice: Subject to any disclaimer, the term of this patent is extended or adjusted under 35 U.S.C. 154(b) by 0 days.

(21) Appl. No.: 09/234,397

(22) Filed: Jan. 20, 1999

(51) Int. Cl.$^7$ .................................................. B62K 11/00
(52) U.S. Cl. .................... 180/220; 180/65.6; 180/205; 475/149; 475/331
(58) Field of Search .................................. 180/220, 230, 180/65.1, 65.5, 65.6, 205, 206, 207; 475/149, 323, 324, 331; 310/67 R

(56) References Cited

U.S. PATENT DOCUMENTS

| | | | |
|---|---|---|---|
| D. 338,825 | 8/1993 | Brainard | D8/303 |
| D. 342,926 | 1/1994 | Russell | D12/111 |
| 2,397,115 | 3/1946 | Argyris | 180/34 |
| 2,457,430 | 12/1948 | Argyris | 180/34 |
| 2,937,706 | 5/1960 | Chandler | 180/19 |
| 3,921,741 | 11/1975 | Garfinkle et al. | 180/34 |
| 4,030,562 | 6/1977 | Leighton et al. | 180/34 |
| 4,044,851 | 8/1977 | Shaw et al. | 180/33 |
| 4,191,065 | 3/1980 | Golobay et al. | 74/489 |
| 4,232,565 | 11/1980 | Leonheart | 74/489 |
| 4,346,777 | 8/1982 | Restelli | 180/220 |
| 4,512,567 | 4/1985 | Phillips | 272/73 |
| 4,650,429 | 3/1987 | Boda | 440/87 |
| 4,721,177 | 1/1988 | Qizhen | 180/205 |
| 4,871,042 | 10/1989 | Hsu et al. | 180/220 |
| 4,930,590 * | 6/1990 | Love et al. | 180/55 |
| 5,101,924 | 4/1992 | Yamagiwa et al. | 180/220 |
| 5,103,125 | 4/1992 | Ogden | 310/72 |
| 5,143,330 | 9/1992 | Kaye | 244/234 |
| 5,242,028 | 9/1993 | Murphy et al. | 180/220 |
| 5,246,082 * | 9/1993 | Alber | 180/65.5 |
| 5,341,892 | 8/1994 | Hirose et al. | 180/220 |
| 5,364,271 | 11/1994 | Aknin et al. | 434/61 |
| 5,474,148 | 12/1995 | Takata | 180/206 |
| 5,560,266 | 10/1996 | Shikimori et al. | 74/594.1 |
| 5,564,316 | 10/1996 | Larson et al. | 74/551.9 |

(List continued on next page.)

OTHER PUBLICATIONS

Frank E. Jamerson, Ph.D. "Electric Worldwide 96: China Exhibition Shanghai/Interbike Anaheim," 3$^{rd}$ Ed., Jan. 1997.
"ATS610LSC—Dynamic, Peak–Detecting, Differential Hall–Effect Gear–Tooth Sensor," *Allegro*, Sep. 1998, pp. 1–12.
"ATS610LSA and ATS611LSB—Dynamic, Peak–Detecting, Differential Hall–Effect Gear–Tooth Sensors," *Allegro*, Dec. 1998, pp. 1–8.
Jamerson, Frank E, Ph.D., "Electric Bikes Worldwide 96: China Exhibition Shanghai/Interbike Anaheim," *Electric Battery Bicycle Company electric bike industry reports*, Third Edition, Jan. 1997.
Product Literature from Allegro MicroSystems, Inc., "ATS610LSA and ATS611LSB—Dynamic, Peak–Detecting, Differential Hall–Effect Gear–Tooth Sensors" (pp 1–8).
Product Literature from Allegro MicroSystems, Inc., "ATS610LSC—Dynamic, Peak–Detecting, Differential Hall–Effect Gear–Tooth Sensors" (pp 1–12).

*Primary Examiner*—Kevin Hurley
(74) *Attorney, Agent, or Firm*—Townsend and Townsend and Crew LLP

(57) ABSTRACT

An electric motor assembly comprises a housing and a spindle disposed to rotate in the housing. A motor is provided which comprises a stator coupled to the housing, and a rotor rotatably disposed within the stator such that the rotor is disposed about the spindle. The assembly further includes an output driver, and a gear system operably coupled to the rotor and the output driver to rotate the output driver upon operation of the motor.

18 Claims, 7 Drawing Sheets

U.S. PATENT DOCUMENTS

| | | | |
|---|---|---|---|
| 5,570,752 | 11/1996 | Takata | 180/206 |
| 5,581,136 | 12/1996 | Li | 310/67 R |
| 5,595,089 * | 1/1997 | Watanabe et al. | 74/89.15 |
| 5,666,858 | 9/1997 | Von Der Osten-Sacken et al. | 74/489 |
| 5,732,786 | 3/1998 | Fujigaki | 180/19.3 |
| 5,749,429 * | 5/1998 | Yamauchi et al. | 180/205 |
| 5,763,980 * | 6/1998 | Li | 310/323 |
| 5,941,332 | 8/1999 | Dimick | 180/205 |
| 5,941,333 * | 8/1999 | Sun et al. | 180/206 |
| 6,007,447 * | 12/1999 | Lin | 475/149 |
| 6,012,538 * | 1/2000 | Sonobe et al. | 180/220 |

* cited by examiner

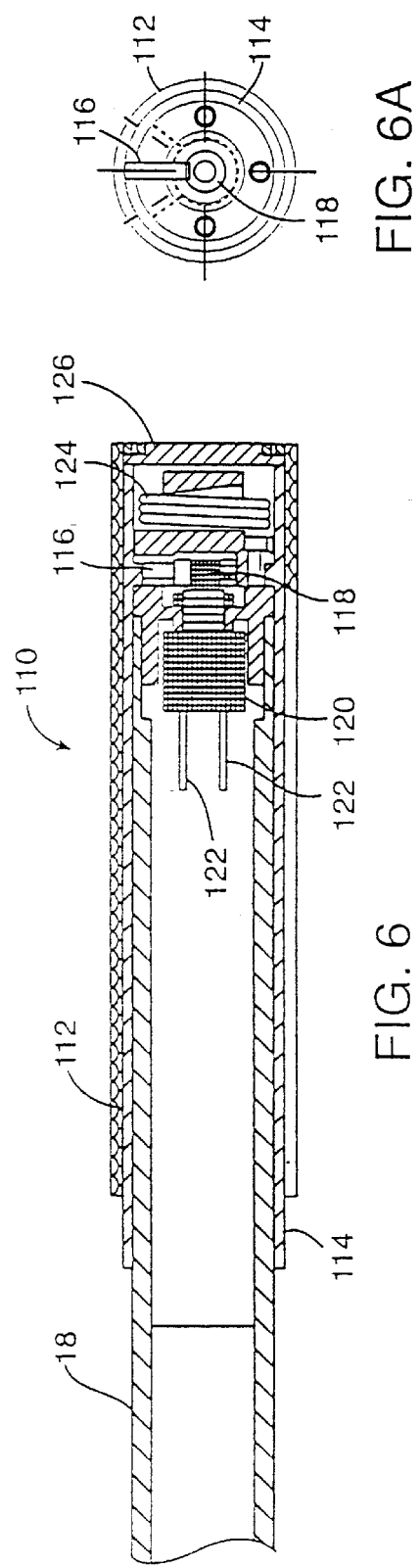

ELECTRIC BICYCLE AND METHODS

BACKGROUND OF THE INVENTION

The invention relates generally to the field of cycles, and in particular to bicycles. More specifically, the invention relates to an electric assist bicycle which is configured to maximize the efficiency of the motor and to prolong the life of the battery which supplies electrical current to the motor.

Over the last 150 years, the bicycle has evolved to become one of the most efficient means of transportation in terms of conversion of energy into distance travelled. For example, most modern bicycles require only about 400 watts (½ horsepower) to propel the bicycle at 15 m.p.h. on level ground. The efficiency of the bicycle has also been optimized to minimize the effort required by the rider. For instance, most modern bicycles include an efficient gear system to minimize rider effort.

To further reduce the amount of human effort required to propel a bicycle, a variety of electric bicycles have been introduced. Presently, about 50 to 100 companies are producing or are planning to produce electric bicycles. In most cases, however, such bicycles do not utilize the efficiency of the bicycle through the use of mechanical gears.

The human muscle and modern battery are similar in their ability to produce power from stored energy. Similarly, both are able to produce more energy by keeping the torque per stroke low and the frequency high.

The human muscle is able to function in two states: anaerobic or aerobic. In anaerobic contraction, the muscle utilizes stored ATP fuel to power the muscle without the need for oxygen. In this case, the muscle can produce large amounts of energy for a short duration. The byproduct of this high energy output is lactic acid. As muscle contraction continues in an anaerobic state, the lactic acid in the muscle builds until it inhibits further muscle contraction. After a period of rest, the lactic acid is removed from the muscle by the blood system and muscle contraction can continue (assuming a sufficient store of ATP fuel). Aerobic muscle contraction allows for extended periods of exertion, but at a lower level of power than anaerobic exercise. In aerobic exercise, sufficient oxygen is supplied to the muscle so that the muscle is able to use the soluble fat in the blood as the primary fuel.

The gears of modern bicycle allow the rider to exercise the muscle in the aerobic range to allow continuous long distance riding. The gears are utilized to keep the rider's pedal speed at a high rotating speed (usually between about 60 to 100 rpm). At higher pedaling speeds, the force output for muscle contraction is low so that the muscle is able to stay in the aerobic region.

The original bicycle used a single fixed gear ratio (similar to most electric bicycles) and was severely limited in its ability to negotiate steep terrain. The number of gears on a bicycle has evolved so that the present mountain bike has up to 27 gears to allow for riding on a variety of terrains.

Similar to the human muscle, the modern battery has an efficient and an inefficient region. The battery delivers current to the motor, which produces torque in the motor. The motor torque increases linearly with motor current. High currents are inefficient.

At high current discharge rates, the battery experiences problems similar to lactic acid buildup in the human muscle. More specifically, in the battery, hydrogen gas is formed on the charge plate. Hydrogen gas acts as a barrier to the transfer of electrons. As the high current discharge continues, the hydrogen continues to build on the plates until the battery is unable to deliver current.

Another important issue to consider at high current discharge rate is that the run time of the battery is reduced exponentially with linear increases in motor current. Further, motor thermal losses are experienced which increase with the square of the motor current. Hence, increased motor current wastes available energy two non-linear ways, i.e., battery losses and motor resistance losses.

As one example, a motor mounted directly to the rear wheel on the bicycle has only a fixed gear ratio. Hence, to obtain a four times increase in torque, the motor current must be increased by four times. However, the four times increase in the motor current increases motor resistive losses by 16 times and thus results in a significant loss in battery run time and reduction in motor efficiency.

The available power from the battery is an exponential function of the rate of current use. Hence, as current discharge increases, the available energy from the battery decreases exponentially. Hence, as more torque is required to move the bicycle (such as during hill climbing or acceleration), more current will be required, thereby exponentially decreasing the available power from the battery.

Hence, it would be desirable to provide improved electrically assisted bicycles and methods for their use which would overcome or greatly reduce these and other problems. The electric bicycles of the invention should be configured to maximize the efficiency of the motor, minimize current use, and thus maximize battery life. It would be desirable if such features could be accomplished by minimizing the required torque while keeping the rotational rate of the motor as high as possible. Preferably, the electric bicycles of the invention will employ the use of a gear system so that torque may be minimized, especially during hill climbing and acceleration. It would further be desirable if the electric bicycles of the invention provided for automatic shifting to keep the motor speed near maximum output while minimizing torque. In another aspect, it would be desirable if such electric bicycles were able to operate using either the motor or the pedals in a parallel manner. At the same time, it would be preferable if such electric bicycles employed the use of a motor which did not turn the crank arms. Such electric bicycles and methods should also be compatible with conventional bicycle equipment, such as derailleurs so that shifting may be accomplished with minimal modification to existing bicycles. Finally, it would be preferable to incorporate the batteries into the bicycle in a manner such that the overall appearance of the bicycle is aesthetically pleasing, such the batteries are protected, and such that the bicycle is provided with a low center of gravity.

SUMMARY OF THE INVENTION

The invention provides exemplary electric motor assemblies, electrically assisted bicycles, and methods for their use. In one exemplary embodiment, the invention provides an electric motor assembly which comprises a housing and a spindle that is disposed to rotate in the housing. A motor is disposed within the housing and comprises a stator coupled to the housing and a rotor rotatably disposed within the stator such that the rotor is disposed about the spindle. The motor assembly further includes an output driver, and a gear system operably coupled to the rotor and the output driver to rotate the output driver upon operation of the motor.

The disposition of the motor and output driver within the housing is advantageous in that it facilitates packaging and manufacturing of the motor assembly. Preferably, the spindle is aligned with a central axis of the housing, with the rotor being concentrically disposed about the spindle, and the stator being concentrically disposed about the rotor. Such a configuration allows for a compact design to allow the motor to conveniently fit within the housing.

In another particularly preferable aspect, a front sprocket assembly is operably coupled to the output driver such that the sprocket assembly rotates upon rotation of the output driver. By having the motor turn the sprocket assembly, the motor assembly may be used in connection with mechanical gears of the modern bicycle to minimize the amount of torque required, thereby greatly increasing battery life.

In another particular aspect, the gear system is coupled to a motor driver. The motor assembly further includes a first clutch to engage the motor driver with the output driver when the motor driver is rotated faster than the output driver. In this way, when the rider is pedaling at a rate which causes the output driver to rotate faster than the motor is turning the motor driver, the first clutch will not engage the motor driver with the output driver. Hence, the rider is able to pedal the bicycle and not turn the motor. Conversely, if the motor turns the motor driver at a rate which is faster than the rider is pedalling, the first clutch is engaged so that the motor causes the output driver (and hence the sprockets) to rotate. Optionally, another clutch mechanism may be provided which allows the rider to engage the clutch during pedaling for regenerative charging of the battery.

In yet another aspect, a crank arm is coupled to the spindle, and a pedal is coupled to a crank arm. A second clutch is also provided to engage the crank arm with the output driver when the crank arm is rotated faster than the output driver (thereby releasing the first clutch) so that the rider's legs cause rotation of the output driver. Use of the second clutch is also advantageous because, when the motor is turning the output driver, the second clutch will ensure that the crank arm is disengaged. In this way, the motor is able to turn the sprocket assembly but not the crank arms. Preferably, the first clutch and the second clutch are coaxially aligned with an axis of the spindle to allow for packaging of the motor in the small space available between the crank arms.

In yet another aspect, the gear system comprises a set of planetary gears to rotate the output driver at a rate of rotation that is less than the motor. Preferably, the gears are configured so that the output speed of the motor is matched to the range of the human leg. For example, the planetary gears are preferably configured so that when the rate of rotation of the motor is in the rate from about 1,800 rpm to about 3,600 rpm, the rate of rotation of the output driver is in the range from about 60 rpm to about 120 rpm. In a specific aspect, the motor speed is approximately 2400 rpm and is employed to turn the crank arms at a rate of about 75 rpm. Such a gear reduction facilitates use of either the motor or pedal power to drive the bicycle. The motor is preferably operated at or near its maximum output level to maximize the efficiency of the motor and minimize current use, thereby prolonging the life of the battery. Operating the motor at or near its maximum output level is also advantageous in that the motor is able to generate more power at higher rates of rotation.

In still yet another aspect, the motor comprises a brushless DC motor. Such a motor is preferable because it provides superior cooling and a high power output. Alternatively, a brushed or SR motor may be used.

In one particular aspect, at least one bearing assembly is coupled to the housing and disposed about the spindle. In this way, the pedals are free to turn when operated by a rider. Use of the bearing assembly is also advantageous in that the crank spindle is used to support the rotor and the planetary gears. Another bearing assembly is preferably disposed between the rotor and the spindle so that rotation of the rotor is generally prevented upon rotation of the spindle by the crank arm. In this way, the rider may pedal the bicycle without turning the motor. Also, this bearing assembly prevents the spindle, and therefore the crank arms, from rotating when the motor is operating.

The invention further provides an exemplary cycle which comprises a frame having a bottom bracket. At least one wheel is operably coupled to the frame. The bicycle further includes a motor assembly that is disposed within the bottom bracket. Preferably, the motor assembly is constructed to be similar to the motor assembly just described. A first sprocket assembly is coupled to the output driver of the motor assembly such that the sprocket assembly rotates upon rotation of the output driver. A second sprocket assembly is coupled to the wheel, and a chain is coupled between the first sprocket assembly and the second sprocket assembly to rotate the wheel upon rotation of the output driver.

The disposition of the motor assembly in the bottom bracket is particularly advantageous in that the motor is housed at a low center of mass of the cycle. Advantageously, the motor is not disposed on the wheel which may otherwise add unsprung mass and cause poor suspension and handling and added rotational dynamics. By packaging the motor in the bottoming bracket, the motor is extremely efficient.

In one particularly preferable aspect, the frame defines a cavity, and at least one battery is housed within the cavity and is electrically coupled to the motor. Preferably, the bicycle frame is constructed of a monocoque design having a hollow center for receiving the battery. In this way, the battery may be mounted in front of the bottom bracket motor and low on the bicycle frame so that the center of mass of the bicycle is low. Further, such a configuration allows the battery to be loaded from the bottom of the bicycle and allows for easy removal. Further, the battery pack and its supports becomes an integral part of the structural strength of the frame when secured within the frame.

In another aspect, the second sprocket assembly includes multiple gears, and a shifting mechanism is provided to move the chain between the gears. In this way, the bicycle may be shifted between gears to minimize the required torque. In turn, less current is required so that the life of the battery may be prolonged. Conveniently, a controller may be provided to control actuation of the shifting mechanism based on the rotational wheel speed and the rotational speed of the first sprocket assembly. In this way, the motor may be kept at a maximum speed by shifting the gears. In this manner, the efficiency of the motor is maximized.

Advantageously, due to the first clutch in the motor, the chain may be shifted between the gears of the second sprocket assembly while the cycle is coasting. This is because the motor is able to turn the front sprocket assembly while the cycle is coasting (and without turning the pedals). Such a feature is advantageous in that the cycle is able to be placed in the appropriate gear which corresponds to the current wheel speed. Further, by the time the rider comes to a stop, the controller has placed the chain in the lowest gear so that starting torque and acceleration may be increased. Similarly, when climbing hills, the controller may be employed to shift down so that more torque may be provided to the rear wheel without using excessive current.

Conveniently, the shifting mechanism may comprise a derailleur and a cable that is coupled to the derailleur. A stepper motor is provided and has a lead screw to tension the cable based on signals received from the controller. In this way, the cycle may include a standard derailleur which in turn is employed to shift the gears when the cable is moved by the stepper motor upon receipt of signals from the controller.

In yet another aspect, the cycle includes a throttle to control the speed of the motor. Conveniently, the throttle may comprise a potentiometer that is mounted within a handlebar. The use of an internal potentiometer is particularly advantageous in that it does not interfere with conventional bicycle shift mechanisms which may optionally be employed to shift the chain between the gears.

In one particular aspect, a swing arm is pivotally coupled to the frame, and the wheel is attached to the swing arm. A suspension mechanism is also disposed between the swing arm and the frame. Such a configuration is made possible by including the motor in the bottom bracket so that it does not interfere with the rear suspension.

The invention further provides an exemplary method for operating a cycle. According to the method, the cycle has a frame and at least one wheel coupled to the frame. A front sprocket assembly is rotatably coupled to the frame and a rear sprocket assembly is coupled to the wheel. A chain is positioned between the first sprocket assembly and the second sprocket assembly. A motor assembly is provided and has a motor driver to turn the first sprocket assembly and a crank arm to turn the first sprocket assembly. Such a cycle is operated by actuating the motor and optionally turning the crank arm. The motor is engaged to turn the first sprocket assembly if the motor driver is turning faster than the first sprocket assembly. However, if the crank arm is rotated faster than the first sprocket assembly, the crank arm is engaged with the first sprocket assembly. In this way, the rider may choose to have the motor drive the bicycle simply by not turning the crank arm. When the rider wishes to operate the bicycle using human leg power, the rider simply turns the crank arm until the first sprocket assembly is rotating faster than the motor driver. Preferably, when the rider begins to turn the crank arm, such action will not cause the motor to rotate.

In one particular aspect of the method, a second sprocket assembly includes multiple gears. In this way, the gears are shifted to maintain the motor speed at a near maximum output level while the front sprocket assembly rotates at a rate within the range of the human leg. In this way, the user is able to take over propulsion of the cycle by simply pedaling faster than the motor driver as previously described. Preferably, the motor is operated at a rate in the range from about 1,800 rpm to about 3,600 rpm, and the front sprocket assembly is turned at a rate in the range from about 60 rpm to about 120 rpm.

In one particularly preferable aspect, the gears are shifted without turning the crank arm. This is made possible by having the motor turn the front sprocket assembly without turning the crank arm.

BRIEF DESCRIPTION OF THE DRAWINGS

FIG. 1A is a cross sectional view of a frame of the bicycle of FIG. 1 taken along lines A—A.

FIG. 1B is a cross sectional view of an alternative frame for holding a rectangular battery pack.

FIG. 6 is a cross-sectional side view of a throttle assembly of the bicycle of FIG. 1 according to the invention.

FIG. 6A is an end view of the throttle assembly of FIG. 6.

DETAILED DESCRIPTION OF THE SPECIFIC EMBODIMENTS

Figure 1:
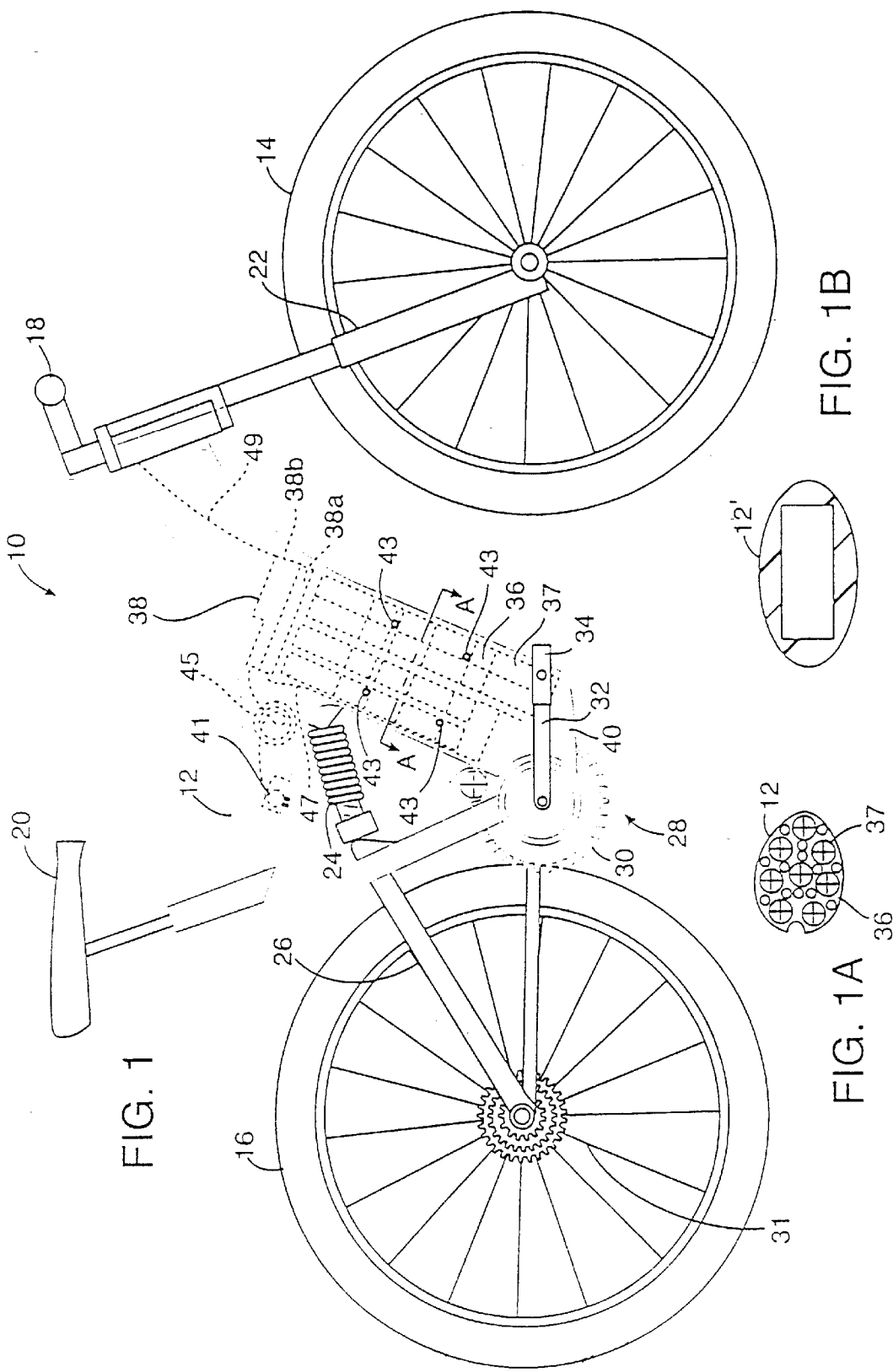
FIG. 1 is a schematic side view of an exemplary electric assist bicycle according to the invention.

The invention provides exemplary electric assisted bicycles as well as motor assemblies for use with such bicycles. Although described primarily in terms of bicycles, it will be appreciated that the principles of the invention may be used with any type of cycle. One important feature of the invention is that it includes a motor/gear reduction assembly that is an integral part of the bicycle bottom bracket and is employed to drive the front sprockets directly by use of a motor driver. By directly driving the front sprockets, the motor may take full advantage of the large range of mechanical gear reductions common to the modern bicycle. Use of such gear reductions allows for the efficiency of the electric motor and battery to be maximized.

The electric motors of the invention are configured to use a minimal amount of current. Because the available energy from the battery decreases exponentially with current discharge, the motors of the invention are able to significantly increase the operating time of the batteries. For example, by utilizing the large range of mechanical gear reductions in the modern bicycle, the required torque to drive the bicycle is kept at a minimum. Since motor torque increases linearly with motor current, the invention is able to utilize the mechanical gear reductions to keep torque, and hence the required current, as low as possible.

Configuration of the bicycles of the invention in this manner provide significant advantages over prior art electric bicycles. For example, bicycles having a motor mounted directly to the rear wheel have only a fixed gear ratio. As such, to obtain a four times increase in torque, the motor current must be increased by four times. The motors of the present invention utilize the 4.5:1 gear ratios of the modern bicycle to produce a four times increase in wheel torque with no increase in current, and no decrease in efficiency.

Conveniently, the bicycles of the invention may employ the use of a controller or microprocessor to accomplish automatic shifting. In this way, the efficiency of the motor is optimized by constantly shifting to the correct gear to reduce the amount of torque required to drive the bicycle. Further, by utilizing the mechanical gear reductions of the modern bicycle, the motor may be operated near its maximum output level. In this way, the motor is able to operate in its most efficient range to further decrease the amount of motor and battery current losses.

Another important feature of the bicycles of the invention is that they are able to operate using either electric power or human power, thereby increasing the overall efficiency of the bicycle. One particular feature of the invention is that the motors include a gear reduction assembly that turns the front sprockets at a rate which is comparable to the rate at which a rider would turn the front sprockets. This configuration provides a way to easily change between electric power control and human power control of the bicycle. Conveniently, the motors of the invention may include a clutch mechanism which allows the rider to use human power simply by pedaling faster than the output of the motor. Conversely, when the rider stops pedaling, the motor will be engaged to drive the front sprockets.

The motors of the invention are preferably configured so that when the rider pedals to turn the front sprockets, such pedaling does not turn the motor. Still another feature of the motors of the invention is that the crank spindles are not rotated by the motor, but only by the rider.

One particular advantage of utilizing the mechanical gear reductions of the modern bicycle is that such a transmission has been optimized to be extremely efficient. By coupling the motor of the invention with this transmission, great efficiencies are achieved. Further, the motors of the invention are preferably configured so that they are simple in their design to reduce internal frictional losses to further increase the efficiency of the motors. In one exemplary embodiment, both the motor and the gear reduction assembly are concentrically disposed about the crank spindle so that the resulting motor assembly is both simple in its design and efficient. Further, such a design is compact and lightweight to allow it to easily fit within the bottom bracket of the bicycle.

By utilizing the motors of the present invention with the mechanical gear reductions of the modern bicycle, other advantages are also provided. For example, the bicycles of the invention are able to provide adequate hill climbing ability and acceleration, while other electric bicycles which utilize a motor in the hub or a friction device which couples the motor directly to the tire, have a fixed gear ratio and cannot provide adequate hill climbing ability or acceleration. Moreover, as previously described, the bicycles of the invention are able to minimize torque, and thereby minimize current, when climbing hills and rapidly accelerating.

By employing the electric motors of the invention to directly turn the front sprockets, the bicycles of the invention may use conventional derailleurs or shifting mechanisms. This is because the rotating front sprockets drive the chain as with a conventional bicycle. Conveniently, the controllers or microprocessors of the bicycles may be coupled to an actuator which shifts the gears to optimize the performance of the bicycle.

Another feature of the invention is that it may employ the use of a throttle that does not interfere with shifting mechanisms on the handle bar, such as a Shimano type SIS rapid fire lever. Preferably, the throttles include a potentiometer or other sensing device that is internally disposed within the handlebar so that it does not interfere with a conventional shifting mechanism that is coupled to the handle bar. The potentiometers may be actuated by rotating the handle grip or by applying pressure to the grip. As the rider rotates the potentiometer or increases the pressure on the potentiometer, the speed of the bicycle increases.

Another feature of the bicycles of the invention is that they may be provided with a monocoque frame which includes a cavity which allows the batteries to be held directly in front of the bottom bracket while being disposed as close to the bottom bracket as possible. In this way, the center of gravity in the bicycle is moved to the lowest possible point. In turn, this improves the handling and minimizes the effect of the additional weight of the battery. Further, the battery pack may be secured to the frame to become an integral structural part of the frame. Another advantage of positioning the battery in the frame and including the motor in the bottom bracket is that the motor becomes a part of the swing arm and allows for the use of a rear suspension. The motor may also be attached to the frame (in the bottom bracket) to also allow for the swing arm.

The bicycles of the invention may optionally include a smart controller to monitor motor current and limit the motor output to provide different levels of efficiency and acceleration in response to rider input. The bicycles may also include a motor controller that allows for high acceleration torque, e.g., up to about 10 times the normal riding torque. Excessive heat generation in the motor may be limited by the smart controller that tapers off the current during a short programmed time. A thermal sensor may also be mounted in the motor so that the smart controller may monitor the temperature of the motor and adjust the maximum current to prevent overheating of the motor.

The bicycles of the invention may also employ the use of a torque sensor so that motor torque can be a multiple of the rider torque as required by many national laws governing electric bicycles. Further, the motor controller may be programmed so that the motor does not begin turning until the rider begins turning the pedals at a certain rate of revolution. In this way, the efficiency of the battery may be improved since human power is required to initially accelerate the bicycle.

In still another feature, the bicycles of the invention may be configured to have the motor voltage modulated with a pulse width modulation. In this way, the motor maximum voltage is kept below the minimum battery voltage so that the top speed of the bicycle does not decrease as battery voltage decreases. Preferably, this will be about 20% of the maximum battery voltage.

Referring now to FIG. 1, an exemplary embodiment of an electric assist bicycle 10 will be described. Bicycle 10 comprises a frame 12 to which a front wheel 14 and a rear wheel 16 are coupled. Also coupled to frame 12 is a handlebar assembly 18 and an adjustable seat 20. As shown, bicycle 10 is a mountain-type bicycle and includes a front suspension 22 and a rear suspension 24 as is known in the art. However, it will be appreciated that the electric assist features of the invention may be used with essentially any type of bicycle and is not limited to mountain-type bicycles.

Bicycle 10 further includes a swing arm 26 which is pivotally coupled to frame 12. Use of swing arm 26 is advantageous in that suspension 24 may more effectively be utilized. At the bottom of swing arm 26 is an electric motor assembly 28. Motor assembly 28 includes one or more gears which define a front sprocket assembly 30. Rear wheel 16 includes a plurality of gears defining a second sprocket assembly 31. As is known in the art, a chain is coupled to the first sprocket assembly and the second sprocket assembly so that as the first sprocket assembly is turned, rear wheel 16 will be turned. Further, associated with front sprocket assembly 30 and rear sprocket assembly 31 are front and rear derailleurs, respectively, for moving the chain between the various gears of the front sprocket assembly and the rear sprocket assembly as is known in the art. Although not shown, front and rear brakes are preferably also included as is known in the art to slow or stop the bicycle. Optionally, actuators for actuating the derailleurs and the brakes may be mounted on handlebar assembly 18.

Coupled to front sprocket assembly 30 are a pair of crank arms 32 to which a pair of pedals 34 are coupled as is known in the art. In this way, a rider is able to turn pedals 34 to rotate front sprocket assembly 30. This then moves the chain to turn rear sprocket assembly 31 and thereby turn the rear wheel 16.

As described in greater detail hereinafter, bicycle 10 may be placed in a manual mode where wheel 16 is turned only by operation of pedals 34. Alternatively, bicycle 10 may be placed in an automatic mode where motor assembly 28 serves to turn rear wheel 16. Finally, bicycle 10 may be configured so that the rider may choose to have motor assembly 28 operate the bicycle or the user may choose to manually operate the bicycle simply by turning pedals 34 faster than the motor assembly is able to rotate front sprocket assembly 30.

As shown, frame 12 is of monocoque design and includes a central cavity for holding a battery pack 36. Battery pack 36 is electrically coupled to motor assembly 28 and provides the necessary power to operate the motor assembly. Various electronics 38, including a controller 38a and a battery charger 38b, are also disposed within the central cavity of frame 12 and serve to control the various electrical features of the bicycle as described in greater detail hereinafter. Preferably, frame 12 is constructed to have an opening at a bottom end 40 into which battery pack 36 and the electronics 38 are inserted. However, frame 12 may have other openings to provide access to the battery, including the top end and the sides. Wires 47 extend from battery pack 36 to motor assembly 28 so that electrical current may be provided to motor assembly 28. Electronics 38 also includes battery recharger 38b having a 110 V plug 41 which is held by a power cord retraction mechanism 45. In this way, plug 41 is retractable to allow plug 41 to conveniently be plugged into a conventional power outlet to recharge battery pack 36.

Use of the monocoque design is advantageous in that frame 12 is aesthetically pleasing in appearance. The monocoque design also provides significant structural stability for bicycle 10. Also, mounting bolts 43 are employed to secure battery pack 36 to frame 12 to increase the structural stability of the bicycle. Further, this design allows battery pack 36 to be placed as low as possible on bicycle 10 so that the center of gravity of bicycle 10 is also low to further increase the stability of bicycle 10. As previously mentioned, use of the monocoque design allows for the use of swing arm 26 to be pivotally coupled to frame 12 to improve the suspension of bicycle 10. As still another advantage, the monocoque design provides protection to battery pack 36 from external impact blows and from the environment. Still further, the monocoque design allows more room for the battery pack because there are not frame tubes to interfere with the location of the batteries as with conventional bicycle frames.

Frame 12 is preferably constructed to have an aerodynamic design. As shown in FIG. 1A, battery pack 36 may conveniently be constructed of cylindrical batteries (or cells) 37 to facilitates the aerodynamic design. Use of cylindrical batteries is also advantageous in that cooling spaces are provided around the batteries. It will be appreciated, however, that other battery shapes may be used. For example, as shown in FIG. 1B, frame 12' may have a rectangular interior to hold a rectangular lead acid battery.

Battery pack 36 is preferably constructed of two or more lead acid type batteries, commercially available from a variety of companies, such as Hawker. Such batteries are typically rated at 12 volts each and are able to deliver 100 amps of current. Such batteries typically weigh about 10.8 lbs. each, and are able to operate about one hour between recharges, assuming the bicycle is operating on level ground. However, it will be appreciated that other battery types may be used. For example, as previously described in connection with FIG. 1A, cylindrical batteries, such as NiMH or NiCAD with 1.2 volts/cell and with 30 cells, may also be used. Such a package of 30 cells weighs about 17 lbs.

Bicycle 10 preferably also includes a display panel that is mounted to handlebar assembly 18. The display panel includes various displays and switches which are coupled to electronics 38 by a control wire 49 to facilitate operation of the bicycle 10 as described in greater detail hereinafter.

Figure 2:
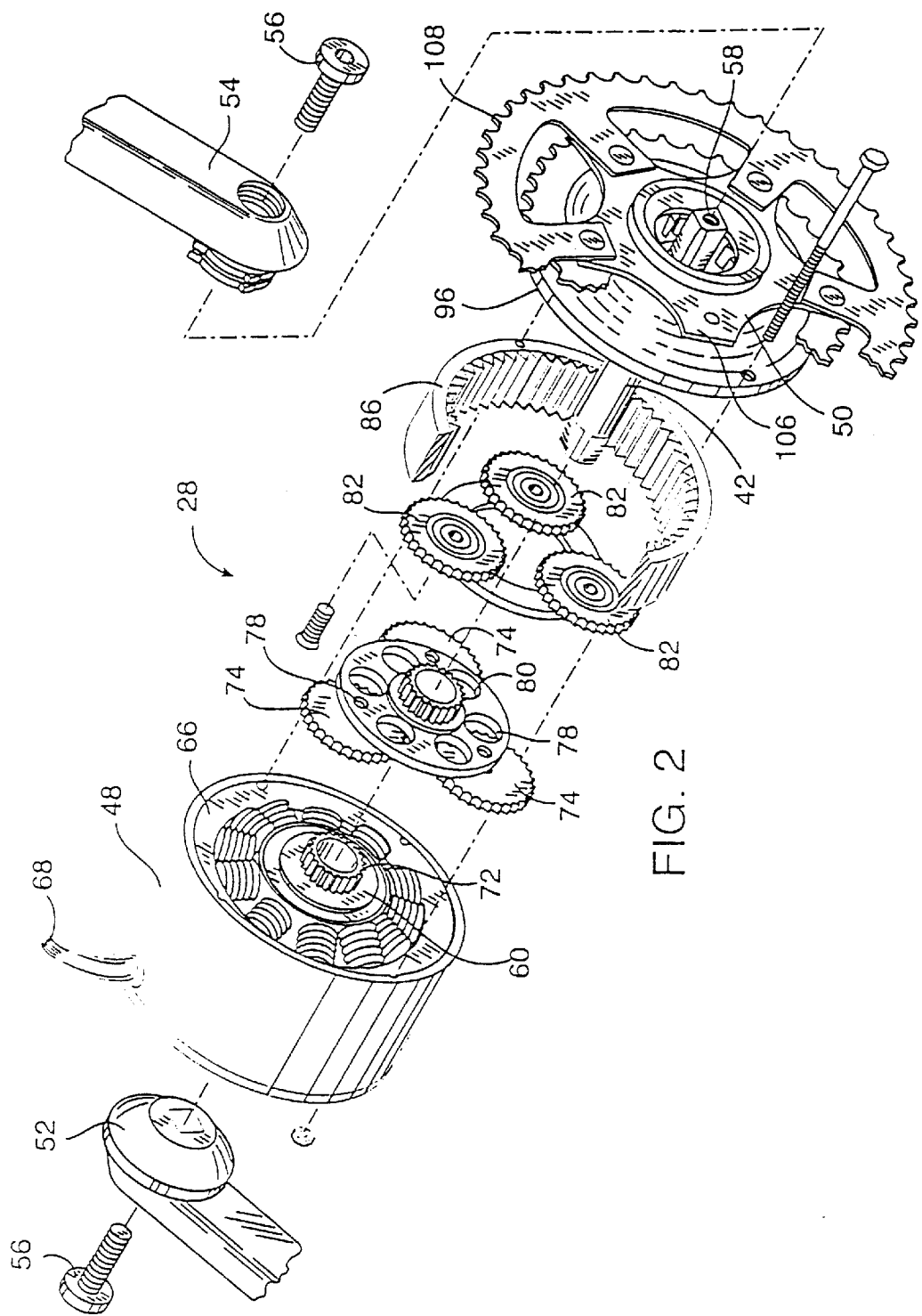
FIG. 2 is an exploded perspective view of an exemplary electric motor assembly of the bicycle of FIG. 1.
Figure 3:
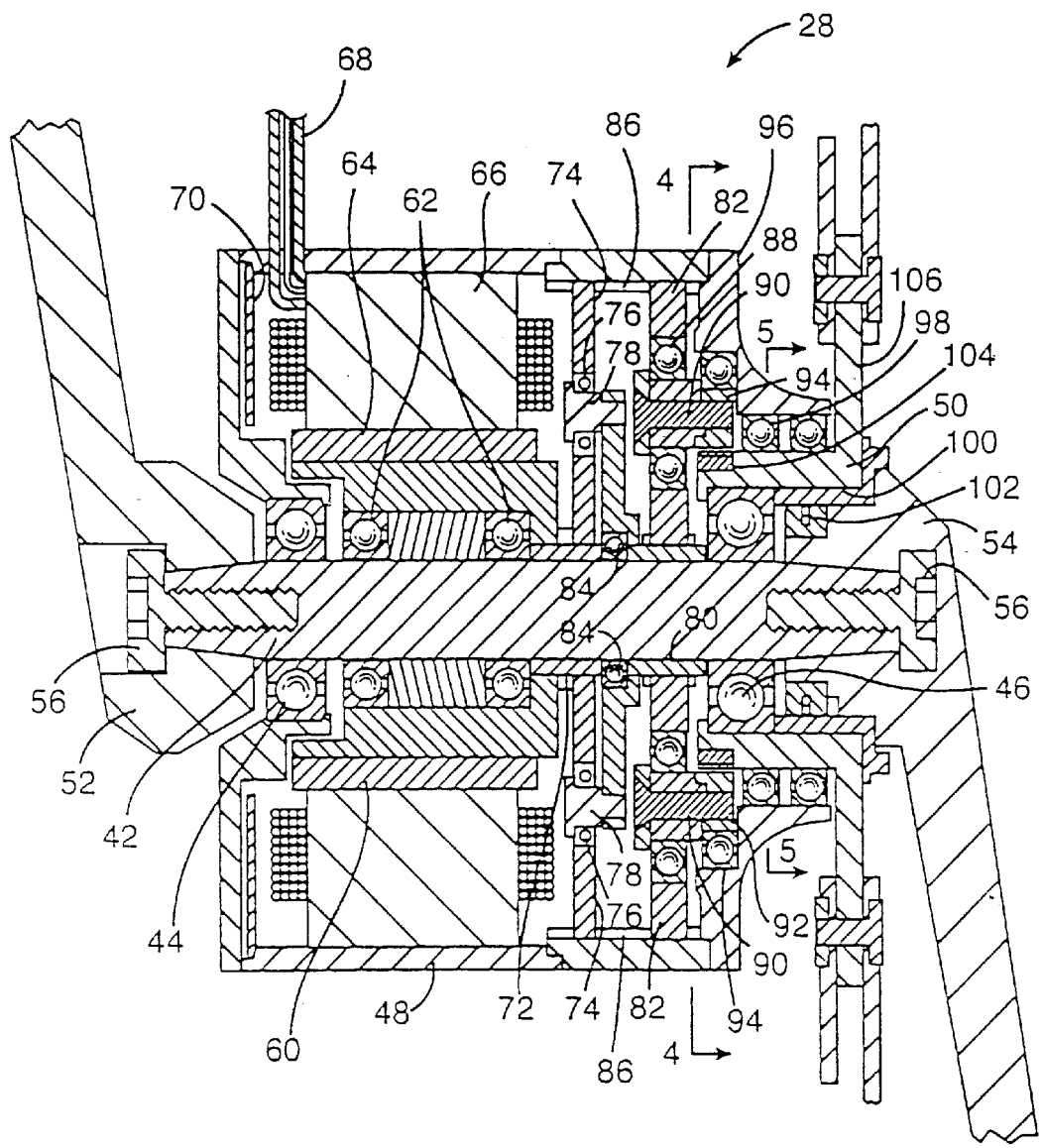
FIG. 3 is a cross-sectional side view of the motor of FIG. 2.

Referring now to FIGS. 2 and 3, construction motor assembly 28 will be described. Although hidden from view, electric motor assembly 28 is disposed within a bottom bracket of swing arm 26. In this way, the weight of the motor assembly is disposed as low as possible on bicycle 10 to lower its center of gravity. Further, by providing a simple design, the motor assembly is able to fit within the bottom bracket, thereby further enhancing the physical appearance of the bicycle.

Motor assembly 28 includes a number of components which are coaxial with a main spindle 42. Further, main spindle 42 is also coaxial with the bottom bracket of the bicycle frame. Main spindle 42 which passes through the entire motor assembly, and is supported by left and right spindle bearings 44 and 46, respectively. (See FIG. 3.) The outside diameter of left spindle bearing 44 is mounted to a main housing 48. Main housing 48 is employed to house most of the components of the motor assembly and conveniently fits within the bottom bracket of the bicycle as previously described. Right spindle bearing 46 is mounted in an output driver 50. Coupled to main spindle 42 is a left crank arm 52 and a right crank arm 54. Crank arms 52 and 54 are coupled to spindle 42 with a tapered positive engagement and by the use of screws 56 which are screwed into threaded slots 58 in main spindle 42.

Motor assembly 28 further includes a motor rotor assembly 60 which is mounted to the outside diameter of rotor ball bearings 62. (See FIG. 3.) A motor magnet 64 is fixed to motor rotor assembly 60. The inner diameter of rotor ball bearings 62 are mounted on spindle 42. Motor rotor assembly 60 is free to rotate independent of spindle 42 as well as crank arms 52 and 54 which are mounted to spindle 42. A motor stator 66 is fixed to main housing 48. A plurality of motor control wires 68 exit through main housing 48. A circuit board 70 (see FIG. 3) having position sensing devices is mounted to a left side of main housing 48.

A first planet sun gear 72 is mounted directly to the right side of motor rotor assembly 60. The outer diameter of first planet sun gear 72 is meshed with three first planet gears 74. The three first planet gears 74 are mounted on ball bearings 76. The inner diameter of ball bearings 76 are mounted to shafts 78. The ends of shaft 78 are mounted to the flange of a second sun gear 80.

Figure 4:
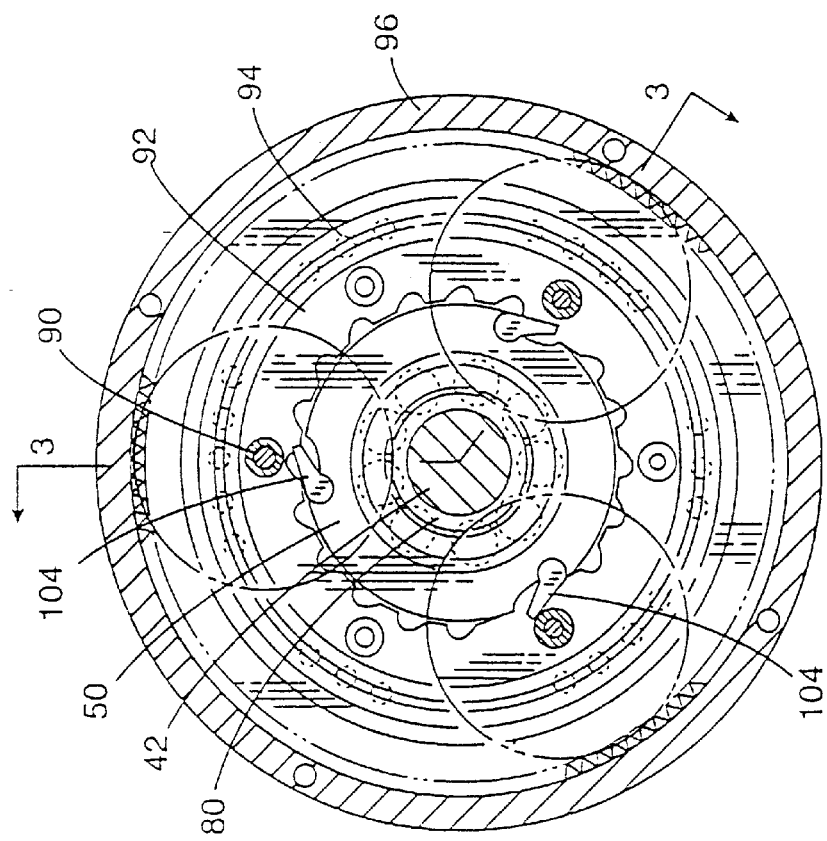
FIG. 4 is a cross-sectional end view of the motor of FIG. 3 taken along lines 4—4.

The outside diameter of second sun gear 80 is meshed with three second planet gears 82. Second sun gear 80 is supported on spindle 42 by bearings 84. The outer diameters of first planet gears 74 and second planet gears 82 are meshed with a ring gear 86. Ring gear 86 is machined directly into main housing 48. The inner diameters of the second planet gears 82 are mounted to ball bearings 88. (See FIG. 3.) The inner diameter of ball bearings 88 are mounted to shafts 90. Shafts 90 are attached to a motor output driver ring 92. Motor output driver ring 92 is supported by the inner diameter of bearing 94 as also shown in FIG. 4. The outer diameter of bearing 94 is mounted to a housing end cap 96.

Although motor assembly 28 is shown with bearings 94, it will be appreciated that bearing 94 may be eliminated. In such a case, motor assembly 28 may be modified so that a bearing surface is provided between motor output driver ring 92 and output driver 50 in a manner similar to that described in U.S. Pat. No. 5,570,752, the disclosure of which is herein incorporated by reference.

Figure 5:
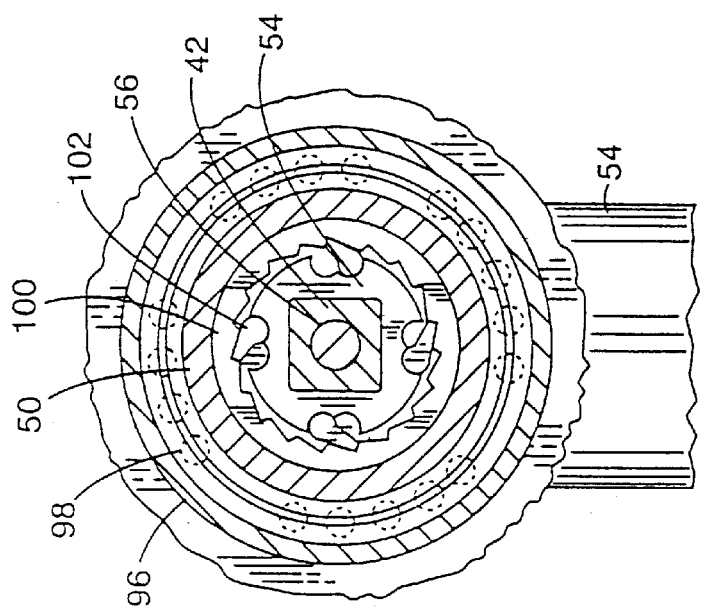
FIG. 5 is a cross-sectional end view of the motor of FIG. 3 taken along lines 5—5.

Output driver 50 is supported by bearings 98. The outer diameter of bearings 98 are mounted in housing end cap 96. Mounted in the right end of output driver 50 is a crank driver ring 100. Mounted in right crank arm 54 are crank ratchet pawls 102, as also shown in FIG. 5. Ratchet pawls 102 are employed to engage crank driver ring 100 as described in greater detail hereinafter.

Mounted in the left outside diameter of output driver 50 are a plurality of driver ratchet pawls 104 which are employed to engage motor output with driver ring 92 as described in greater detail hereinafter. The right outside diameter of output driver 50 is attached to a sprocket support 106. Sprocket support 106 is attached to front drive sprockets 108.

Electric motor assembly 28 is advantageous in that it allows bicycle 10 to be operated in three modes. The first mode is pedal only power. The second mode is motor only power, and the third mode is a variable combination of both pedal and motor power. For pedal only power, pedalling of crank arms 52 and 54 by the rider causes the front sprockets 108 to rotate without rotating motor rotor assembly 60. In this way, significant friction losses to riding the bicycle are eliminated.

When crank arms 52 and 54 are rotated by the rider, spindle 42 rotates freely in bearings 44 and 46. Motor rotor assembly 60 does not rotate due to bearings 62. Further, second sun gears 80 do not rotate because of bearings 84. The rotation of crank arm 54 causes crank ratchet pawls 102 to engage crank driver ring 100. This causes output driver 50 to rotate. Sprocket support 106 and sprockets 108 rotate with output driver 50. The rotational speed of sprockets 108 and crank arms 52 and 54 are the same.

The rotation of output driver 50 does not cause motor output driver ring 92 to rotate because driver ratchet pawls 104 do not engage motor output driver ring 92 in this direction. Because the output driver 50 is not engaged with motor output driver ring 92, there is no drag on crank arms 52 and 54 due to motor friction and the bike pedals rotate freely as on a normal non-motorized bicycle.

For motor only power, the motor drives sprockets 108 but not the crank arms 52 and 54 which may otherwise cause injury to the rider. The rotation speed of sprockets 108 is reduced from the speed of motor rotor assembly 60 by the combined ratio of the two planet gear sets.

When motor power only is used, a magnetic field in motor stator 66 causes motor rotor assembly 60 to rotate. First sun gear 72 rotates with motor rotor assembly 16. The rotation of first sun gear 72 causes the first planet gears 74 to rotate. Due to the fixed nature of ring gear 86 and the relationship of the planetary gears, the speed of the second sun gear 80 is reduced by the design ratio. Preferably, the ratio is approximately 5.6 to 1. However, it will be appreciated that other ratios may also be employed. Rotation of second sun gear 80 causes the three second planet gears 82 to rotate in ring gear 86. This second rotation causes another reduction. Preferably, this reduction is also 5.6 to 1. However, other reductions may also be employed. Due to the multiplication of gear trains, the overall speed reduction of the motor output driver ring 92 is 31.86 to 1. In other words, the speed of motor output driver ring 92 is reduced to 31.86 times from the speed of motor rotor assembly 60.

As motor output driver ring 92 rotates, it engages motor driver ratchet pawls 104 and causes output driver 50 to rotate. As with pedal-only power, the rotation of output driver 50 causes sprockets 108 to rotate. The rotation of output driver 50 does not cause crank arms 52 and 54 or spindle 42 to rotate because crank ratchet pawls 102 do not engage crank driver ring 100 in this direction.

In the mode having a variable combination of pedal and motor power, power is delivered either by the motor or the rider. If the motor speed is higher than the pedal speed, the motor will cause the bicycle to go faster. However, if the rider increases pedaling speed above the motor speed, the rider will make the bicycle move. Hence, the engagement of output driver 50 depends on the relative speed of the motor and pedals. Whichever is rotated faster will drive the sprockets 108.

The invention further provides the ability to recharge the batteries by turning of the pedals. In this option, the motor clutch (motor driver ratchet pawls 104) may be eliminated and direct contact made between motor output driver ring 92 and output driver 50. In this manner, when the pedals rotate, the motor also rotates. To eliminate the drag from the motor in pedal only mode, the motor turns just enough to eliminate the drag.

EXAMPLE

The electric bicycle of FIG. 1 was theoretically compared to a conventional direct drive electric bike. The electric assist bicycle of the invention was provided with multiple gears. Both bicycles were tested for two situations. First, travel was on level ground at 20 mph. In the second situation, hill climbing was performed at 5 mph. Controller losses are not included in this example and are assumed to be the same for both cases.

The results of the test are illustrated in Tables 1 and 2 below.

TABLE 1

Comparison at 20 MPH on Flat Ground with 66 in-LB Wheel Torque

|  | Direct Drive to Wheel 8:1 Fixed Motor Reduction | Bottom Bracket Motor (Multiple Gear Ratios) 4:1 Final Gear Reduction |
|---|---|---|
| Motor Resistance | 0.1 ohm | 0.1 ohm |
| Torque Constant | 11 in oz/amp | 11 in oz/amp |
| Voltage Constant | 8 volts/KRPM | 8 volts/KRPM |
| Battery System Voltage | 24 VDC | 24 VDC |
| Motor Terminal Voltage (1) | 20.4 Volts | 20.4 Volts |
| Motor Current | 12 Amps | 12 Amps |
| Input Power | 245 Watts | 245 Watts |
| Output Power | 231 Watts | 231 Watts |
| Resistive Losses | 14 Watts | 14 Watts |
| Motor Efficiency | 94% | 94% |
| Motor Speed | 2400 RPM | 2400 RPM |
| Wheel Speed | 300 RPM (20 MPH) | 300 RPM (20 MPH) |
| Wheel Torque | 66 in-LB | 66 in-LB |
| Battery Rating | 12 amp-hr | 12 amp-hr |
| Battery Current (1) | 10.2 Amps | 10.2 Amps |
| Battery Run Time (2) | 50 minutes | 50 minutes |
| Battery Energy | 204 watt-hr | 204 watt-hr |

(1) Based on PWM control of motor speed.
(2) Based on Published Current Vs Run Time Data

TABLE 2

Comparison at 5 MPH Hill CLimbing
with 264 in-LB Wheel Torque

| | Direct Drive to Wheel 8:1 Fixed Motor Reduction | Bottom Bracket Motor (Multiple Gear Ratios) 1:1 Final Gear Reduction |
|---|---|---|
| Motor Resistance | 0.1 ohm | 0.1 ohm |
| Torque Constant | 11 in oz/amp | 11 in oz/amp |
| Voltage Constant | 8 volts/KRPM | 8 volts/KRPM |
| Battery System Voltage | 24 VDC | 24 VDC |
| Motor Terminal Voltage (1) | 10 Volts | 10 Volts |
| Motor Current | 48 Amps | 12 Amps |
| Input Power | 480 Watts | 245 Watts |
| Output Power | 250 Watts | 231 Watts |
| Resistive Losses | 230 Watts | 14 Watts |
| Motor Efficiency | 52% | 94% |
| Motor Speed | 600 RPM | 2400 RPM |
| Wheel Speed | 750 RPM (5 MPH) | 75 RPM (5 MPH) |
| Wheel Torque | 264 in-LB | 264 in-LB |
| Battery Rating | 12 amp-hr | 12 amp-hr |
| Battery Current (1) | 20 Amps | 10.2 Amps |
| Battery Run Time (2) | 20 minutes | 50 minutes |
| Battery Energy | 158 watt-hr | 204 watt-hr |

(1) Based on PWM control of motor speed.
(2) Based on Published Current Vs Run Time Data This example illustrates that on level ground, the motor efficiency of both systems is approximately the same, i.e., about 94%. Battery run time is 50 minutes. However, with hill climbing efficiency changes radically. For the bicycle of FIG. 1, utilization of the 4:1 gear change reduction, maintains the motor efficiency at 94% with a battery run time of 50 minutes. In comparison, the direct drive bicycle motor efficiency dropped by almost one half to 52%. Further, the battery run time was reduced to almost a third and was only about 20 minutes. In both cases, power output to the rear wheel is kept constant at 231 watts.

Acceleration of electric motor assembly 28 is preferably accomplished by use of a throttle assembly 110 as illustrated in FIG. 6. Conveniently, throttle assembly 110 is coupled to handlebar assembly 18. Throttle assembly 110 comprises a rubber grip 112 which is disposed about a throttle sleeve 114. Coupled to throttle sleeve 114 is a planet gear 116 which revolves around a sun gear 118. Throttle assembly 110 further includes a potentiometer 120 which is rotated when grip 112 is rotated. The potentiometer then sends a signal through wires 122 which are coupled to electronics 38 (see FIG. 1) so that electrical current can be supplied to motor assembly 28.

Conveniently, a spring 124 is provided to bias grip 112 in a home position so that when released, grip 112 will return to the home position and no electrical current will be supplied to motor assembly 28. An end cap 126 provides a convenient covering for the internal components. Use of throttle assembly 110 is particularly advantageous in that it has a low profile on handlebar assembly 18 so that other components may be placed on handlebar assembly 18 without interference from throttle assembly 110.

The invention further provides an exemplary shift system that allows for automatic shifting on the bicycles of the invention as well as for any standard bicycle. The shift system of the invention allows for automatic shifting on essentially any type of gear system including those having conventional derailleurs, those having internal hub systems, and the like. The shift system of the invention is particularly useful with the bicycles described herein because such bicycles are able to turn the front sprockets without turning the pedals. In this way, the shift system of the invention is able to take advantage of the turning sprockets to constantly shift to the correct or desired gear, even when coasting to a stop when the rider is not pedaling.

By automatically shifting to the correct gear, the shift system enables the bicycle to be operated at an optimal torque level. With the electric bicycles of the invention, this is advantageous because minimal current is required since torque is optimized. By way of example, one of the problems associated with both regular bicycles and electric bicycles is the need to shift to a lower gear when coasting to a stop sign. Otherwise, the bicycle will be in a high gear when exiting the stop sign, making it difficult to turn the pedals or to operate the motor. A conventional derailleur system requires the chain to be moving for shifting to occur. Because the motor of the invention is able to rotate the front sprockets without rotating the pedals, the bicycle can be shifted while coasting to a stop. Further, the shift system of the invention takes advantage of the moving chain to automatically shift the bicycle to the correct gear depending upon the wheel speed. With the electric bicycle, automatically shifting is further important because the electric bicycle accelerates much faster than a conventional bicycle, requiring the rapid shifting of the gears.

To optimize efficiency, the electric motors of the invention are preferably kept at maximum speed (which preferably equates to a pedal speed of about 75 rpm). By operating the motor at a maximum rpm, internal heat losses are minimized. Hence, by knowing the gear ratios and the wheel speed, the shift system employs the use of a microprocessor to shift to the correct gear for the current speed. In this way, when the motor is running, the motor speed is kept at a maximum so that motor efficiency is optimized. If the rider adds additional power through the pedals, the microprocessor is configured to shift to a higher gear. Such variables are preferably programmed into the microprocessor to optimize the efficiency for each rider.

Figure 7:
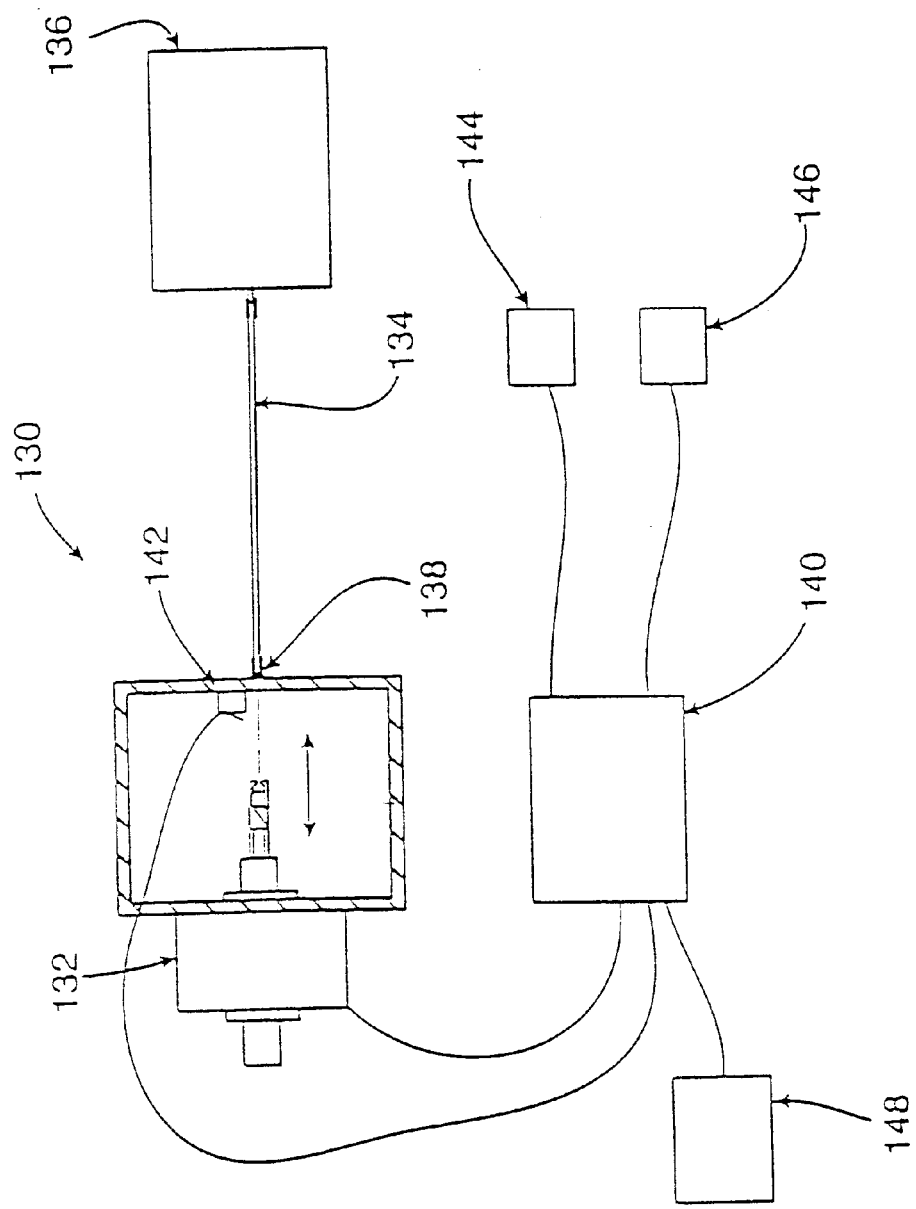
FIG. 7 is a schematic diagram of an exemplary shifting system according to the invention.

Referring to FIG. 7, an exemplary embodiment of a shift system 130 will be described. Shift system 130 includes a linear stepper motor 132 to move a derailleur cable 134. An exemplary stepper motor that may be used is a Haydon Switch and Instrument stepper motor, part no. 46441-12. Cable 134 is coupled to a derailleur shifting mechanism 136 or an internal hub shifting mechanism as is known in the art. Conveniently, a cable adjuster 138 may be provided to adjust the tension in cable 134. Stepper motor 132 is electrically coupled to a controller 140 or microprocessor. The amount of movement of stepper motor 132 is based upon the specific type of shifting mechanism and is programmed into controller 140. The drive for stepper motor 132 is a conventional stepper motor drive as is known in the art. As an alternative to using a stepper or DC motor to move cable 134, it will be appreciated that other designs may be employed including use of a rotating motor with a gear reduction. Stepper motor 132 further includes a limit switch 142 which is used to define a home position on power up of stepper motor 132. Limit switch 142 may be a contact type or non-contact type of switch.

In operation, stepper motor 132 is given a number of pulses by controller 140 to cause the motor to move an exact amount. It will be appreciated that various position sensors may also be employed to determine the position of stepper motor 132.

Also coupled to the controller is a wheel speed sensor 144, a front sprocket speed sensor 146, and a handle bar interface 148. With this configuration, controller 140 determines the correct gear by measuring wheel speed with wheel speed sensor 144 and the front sprocket speed with front sprocket speed sensor 146. Based on the programmed gear ratios, controller 140 selects the correct gear and commands stepper motor 132 to move to the required position. Stepper motor 132 then moves cable 134 causing derailleur shifting mechanism 136 to shift gears. Because motor 132 moves cable 134, a variety of gear shift mechanisms may be employed, including both internal hub or derailleur type shifting mechanisms. Further, it will be appreciated that system 130 may be employed to shift gears on both the front sprockets and the rear sprockets of the bicycle. Still further, because the electric bicycles of the invention are able to move the chain, even when the rider is coasting, the shift system 130 may be employed to place the bicycle in a low gear when the rider coasts to a lower speed or stops altogether so that the required torque is minimized when the rider begins to accelerate.

Shift system 130 may be incorporated into bicycle 10 by including the controller in the electronic circuitry stored within frame 12 and by including the stepper motor and appropriate sensors on the bicycle. In this way, bicycle 10 may be operated by using the automatic shifting features of shift system 130. Conveniently, bicycle 10 may be provided with a standard shifting system, such as a Shimano-type gear shifter, as is known in the art.

Figure 8:
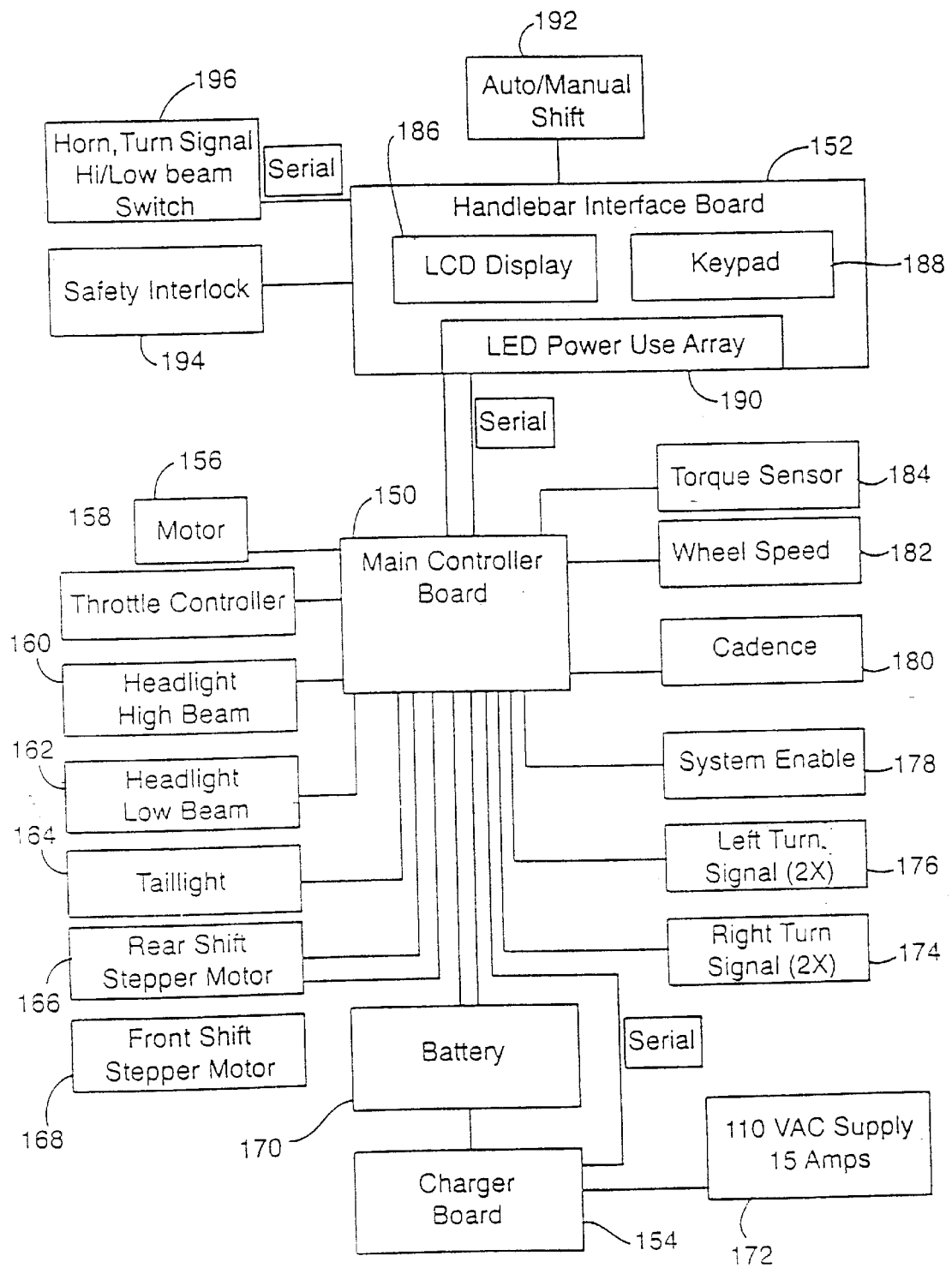
FIG. 8 is a schematic view of the electronic circuitry employed in the bicycle of FIG. 1.

Referring now to FIG. 8, the electrical circuitry of bicycle 10 will be described. The circuitry includes a main board controller 150, a handle bar interface board 152 and a battery charger board 154. Main controller board is representative of circuitry 38 of FIG. 1. The voltage of the system is preferably 24 volts DC but may optionally be 36 or 48 volts DC. Main controller board 150 is coupled to a motor 156 which is representative of motor assembly 28 of FIG. 1. Main controller board 150 is also coupled to a throttle controller 158 which is representative of throttle assembly 110 of FIG. 6. A headlight highbeam 160 and a headlight lowbeam 162 are also coupled to main controller board 150 so that the bicycle may be provided with lights. Similarly, a tail light 164 is also coupled to main controller board 150. A rear shift stepper motor 166 is coupled to main controller board 150 and is representative of stepper motor 132 of FIG. 7. Optionally, a front shift stepper motor 168 may also be coupled to main controller board 150 to control shifting of the chain on the front gears.

A battery 170 is further coupled to main controller board 150 and is representative of battery pack 36 of FIG. 1. Charger board 154 is also coupled to battery 170. Charger board 154 is configured so that it may be coupled to a power supply 172, which for convenience of illustration is shown as a 110 VAC, 15 amp power supply. However, it will be appreciated that other power supplies may be used. Charger board 154 preferably includes a retractable cord which will allow it to be coupled to power supply 172. Charger board 154 is configured to sense the voltage of battery 170 and will automatically configure itself for such a voltage. Charger board 154 may alternatively be configured to monitor both the temperature and voltage of battery 170. Further, charger board 154 may charge using either a constant voltage or constant current. Charger board 154 is preferably cooled through a heat sink that is mounted to the frame of the bicycle. A fan may also be used for forced air cooling, if required.

Also coupled to main controller board 150 is a right turn signal 174 and a left turn signal 176. A system enable 178 and a cadence 180 are coupled to main controller board 150. System enable is a safety-type interlock which prevents operation of the bicycle until actuated. Cadence 180 displays the front sprocket speed. A speed sensor 182 and a torque sensor 184 are also coupled to main controller board 150. Speed sensor 182 may be employed to facilitate automatic shifting as previously described. Torque sensor 184 may be employed to monitor the torque of the motor so that shifting may occur using the shift system as previously described to keep torque at a minimum.

Handlebar interface board 152 includes an LCD display 186 and a keypad 188. Keypad 188 may be employed to control various functions, such as control of headlights 160 and 162. LCD display 186 may be configured to display various operating parameters such as bicycle speed, current gear, battery life, and the like. An LED power use array 190 is included on handle interface board 152 and is employed to show the amount of current used. The LED array may also be used to show the amount of energy remaining in the battery pack.

The handlebar interface board 152 may optionally include an auto/manual shift pushbutton interface 192 which is preferably located near the left hand grip of the handlebar. Auto/manual shift 192 is preferably configured to be placed in one of three modes. The first mode is an auto shift mode where shifting is automatic based on wheel speed as previously described. The second mode is manual shift where the rider is responsible for shifting the gear using a conventional shifting mechanism or keypad 188. The third mode is a manual upshift only, where downshifting is automatic, while the rider has the option to shift up when they desire. In the automatic shift mode, the gear ratios are previously programmed into main controller board 150. The gears are continuously shifted to keep the front sprocket at the preprogrammed RPM. When coasting, the motor 156 turns the front sprocket when shifting so that the derailleur can shift the gears as previously described.

A safety interlock 194 is coupled to handlebar interface board 152 and prevents operation of the bicycle until appropriate password information has been entered. For example, safety interlock 194 may require the entry of a numeric key code to activate the bicycle. If tampered with, a horn may be activated. Safety interlock 194 may also include an on/off switch to allow for the bicycle to automatically be turned to the manual mode. Further, safety interlock 194 may be configured to set to a "sleep" mode when not in use for a specified time period, such as for 5 or more minutes.

A horn, turn signal, high/low beam switch 196 is also coupled to handlebar interface board 152 and allows for operation of the horn, the turn signals, and the headlights. These switches may also be on a separate board located hear the rider's left hand for ease of operation.

The invention has now been described in detail for purposes of clarity and understanding. However, it will be appreciated that certain changes and modifications may be practiced within the scope of the appended claims.

What is claimed is:

1. An electric motor assembly, comprising:

a housing;

a spindle disposed to rotate in the housing;

a motor comprising a stator coupled to the housing, and a rotor rotatably disposed within the stator such that the rotor is disposed about the spindle;

an output driver;

a gear system operably coupled to the rotor and the output driver to rotate the output driver upon operation of the motor; and a sprocket assembly operably coupled to the output driver such that the sprocket assembly rotates upon rotation of the output driver;

wherein the gear system is coupled to a motor driver, and further comprising a first clutch to engage the motor driver with the output driver when the motor driver is rotating faster than the output driver, a crank arm coupled to the spindle, and a second clutch to engage the crank arm with the output driver when the crank arm is rotated faster than the output driver, and wherein the first clutch and the second clutch are coaxially aligned with an axis of the spindle.

2. A motor assembly as in claim 1, wherein the housing has a central axis, wherein the spindle is aligned with the central axis, wherein the rotor is concentrically disposed about the spindle, and the stator is concentrically disposed about the rotor.

3. A motor assembly as in claim 1, wherein the gear system comprises a set of planetary gears to rotate the output driver at a rate of rotation that is less than the motor.

4. A motor assembly as in claim 2, wherein the rate of rotation of the motor is in the range from about 1,800 rpm to about 3,600 rpm, and the rate of rotation of the output driver is in the range from about 60 rpm to about 120 rpm.

5. A motor assembly as in claim 1, wherein the motor comprises a brushless DC motor.

6. A motor assembly as in claim 1, further comprising at least one bearing assembly coupled to the housing and disposed about spindle so as to generally prevent rotation of the spindle by the motor upon operation of the motor.

7. A motor assembly as in claim 1, further comprising a bearing assembly disposed between the rotor and the spindle to generally prevent rotation of the rotor upon rotation of the spindle by the crank arm.

8. An electric motor assembly, comprising:
   a housing;
   a spindle disposed to rotate in the housing;
   a motor comprising a stator coupled to the housing, and a rotor rotatably disposed within the stator such that the rotor is disposed about the spindle;
   a crank arm coupled to the spindle;
   an output driver; and
   a gear system operably coupled to the rotor and the output driver to rotate the output driver upon operation of the motor;
   wherein the gear system is coupled to a motor driver, and further comprising a first clutch to engage the motor driver with the output driver when the motor driver is rotating faster than the output driver, and a second clutch to engage the crank arm with the output driver when the crank arm is rotated faster than the output driver, and wherein the first clutch and the second clutch are coaxially aligned with an axis of the spindle.

9. A motor assembly as in claim 8, wherein the housing has a central axis, wherein the spindle is aligned with the central axis, wherein the rotor is concentrically disposed about the spindle, and the stator is concentrically disposed about the rotor.

10. A motor assembly as in claim 8, further comprising a sprocket assembly operably coupled to the output driver such that the sprocket assembly rotates upon rotation of the output driver.

11. A motor assembly-as in claim 8, wherein the gear system comprises a set of planetary gears to rotate the output driver at a rate of rotation that is less than the motor.

12. A motor assembly as in claim 11, wherein the rate of rotation of the motor is in the range from about 1,800 rpm to about 3,600 rpm, and the rate of rotation of the output driver is in the range from about 60 rpm to about 120 rpm.

13. A motor assembly as in claim 8, wherein the motor comprises a brushless DC motor.

14. A motor assembly as in claim 8, further comprising at least one bearing assembly coupled to the housing and disposed about spindle so as to generally prevent rotation of the spindle by the motor upon operation of the motor.

15. A motor assembly as in claim 8, further comprising a bearing assembly disposed between the rotor and the spindle to generally prevent rotation of the rotor upon rotation of the spindle by the crank arm.

16. An electric motor assembly, comprising:
   a housing;
   a spindle disposed to rotate in the housing;
   a motor comprising a stator coupled to the housing, and a rotor rotatably disposed within the stator such that the rotor is disposed about the spindle;
   an output driver;
   a gear system operably coupled to the rotor and the output driver to rotate the output driver upon operation of the motor;
   a crank arm coupled to the spindle; and
   a clutch disposed in the crank arm to engage the crank arm with output driver when the crank arm is rotated faster than the output driver.

17. An electric motor assembly, comprising:
   a housing;
   a spindle disposed to rotate in the housing;
   a motor comprising a stator coupled to the housing, and a rotor rotatably disposed within the stator such that the rotor is disposed about the spindle;
   a set of bearings disposed between the rotor and the spindle to permit the rotor to roll over the bearings when rotating about the spindle;
   an output driver;
   a gear system operably coupled to the rotor and the output driver to rotate the output driver upon operation of the motor.

18. An electric motor assembly, comprising:
   a housing;
   a spindle disposed to rotate in the housing;
   a crank arm coupled to the spindle;
   a motor comprising a stator coupled to the housing, and a rotor rotatably disposed within the stator such that the rotor is disposed about the spindle;
   an output driver;
   a first clutch to permit the rotor to rotate the output driver when the first clutch is engaged;
   a second clutch to permit the crank arm to rotate the output driver when the second clutch is engaged;
      wherein the output driver includes engaging components of both the first and second clutch.

* * * * *